(12) United States Patent
Brandl et al.

(10) Patent No.: US 6,311,402 B1
(45) Date of Patent: Nov. 6, 2001

(54) ROTARY TRANSDUCER

(75) Inventors: Alois Brandl, Siegsdorf; Johann Mitterreiter, Chieming, both of (DE)

(73) Assignee: Dr. Johannes Heidenhain GmbH, Traunrent (DE)

( * ) Notice: Subject to any disclaimer, the term of this patent is extended or adjusted under 35 U.S.C. 154(b) by 0 days.

(21) Appl. No.: 09/496,503

(22) Filed: Feb. 2, 2000

(30) Foreign Application Priority Data

Feb. 4, 1999 (DE) .............................................. 199 04 471

(51) Int. Cl.⁷ ...................................................... G01B 7/30
(52) U.S. Cl. ............................................................ 33/1 PT
(58) Field of Search ...................................... 33/1 N, 1 PT, 33/534, 536; 318/605

(56) References Cited

U.S. PATENT DOCUMENTS

| | | |
|---|---|---|
| 4,369,578 | 1/1983 | Ernst . |
| 4,495,700 | 1/1985 | Ernst . |
| 4,530,155 | 7/1985 | Burkhardt et al. . |
| 4,530,159 | 7/1985 | Ernst . |
| 4,616,131 | 10/1986 | Burkhardt . |
| 4,660,288 | 4/1987 | Dangschat . |
| 4,667,096 | 5/1987 | Dangschat . |
| 4,700,062 | 10/1987 | Ernst . |
| 5,018,397 | * 5/1991 | Matich ................................ 33/1 PT |
| 5,446,966 | * 9/1995 | Ishizaki .................................. 33/1 PT |
| 5,981,940 | 11/1999 | Setbacken et al. . |
| 6,194,710 | * 2/2001 | Mitterreiter ......................... 250/231.14 |

OTHER PUBLICATIONS

U.S. application No. 09/286,404, Mitterreiter, filed Apr. 15, 1999, Pending Application Assigned to Dr. Johannes Heidenhain GmbH.
U.S. application No. 09/354,0474, Mitterreiter, filed Jul. 15, 1999, Pending Application Assigned to Dr. Johannes Heidenhain GmbH.
U.S. application No. 09/365,118, Dieter, filed Jul. 30, 1999, Pending Application Assigned to Dr. Johannes Heidenhain GmbH.
U.S. application No. 09/506,752, Feichtinger, filed Feb. 18, 2000, Pending Application Assigned to Dr. Johannes Heidenhain GmbH.

* cited by examiner

*Primary Examiner*—G. Bradley Bennett
(74) *Attorney, Agent, or Firm*—Brinks Hofer Gilson & Lione

(57) ABSTRACT

A rotary transducer and drive shaft system that includes a drive shaft and a rotary transducer that has a stator, a rotor that is rotatable relative to the stator, and a clamping device for connecting the rotor to the drive shaft in a manner fixed against relative rotation. The clamping device includes an eccentric cam that is rotatably supported in a bore of the rotor and has an eccentric circumferential face that comes into contact with the drive shaft and clamps it upon rotation.

16 Claims, 6 Drawing Sheets

ROTARY TRANSDUCER

Applicants claim, under 35 U.S.C. §119, the benefit of priority of the filing date of Feb. 4, 1999 of a German patent application, copy attached, Ser. No. 199 04 471.6, filed on the aforementioned date, the entire contents of which is incorporated herein by reference.

BACKGROUND OF THE INVENTION

1. Field of the Invention

The invention relates to a rotary transducer having a clamping device for connecting a transducer shaft to a drive shaft of a drive unit in a manner fixed against relative rotation.

2. Discussion of Related Art

Such rotary transducers are used particularly in machining tools for measuring the relative position of a tool to a workpiece to be machined. The stator of the rotary transducer is mounted in a manner fixed against relative rotation on the stator of the drive unit, such as a motor, and the transducer shaft is coupled in a manner fixed against relative rotation to the drive shaft.

The object of the invention is to create a rotary transducer with a clamping device for connecting the rotor of the rotary transducer to the drive shaft of a drive unit, which is simple to manufacture and has easily manipulated, secure clamping.

BRIEF SUMMARY OF THE INVENTION

One aspect of the present invention regards a rotary transducer and drive shaft system that includes a drive shaft and a rotary transducer that has a stator, a rotor that is rotatable relative to the stator, and a clamping device for connecting the rotor to the drive shaft in a manner fixed against relative rotation. The clamping device includes an eccentric cam that is rotatably supported in a bore of the rotor and has an eccentric circumferential face that comes into contact with the drive shaft and clamps it upon rotation.

A second aspect of the present invention regards a rotary transducer and drive shaft system that includes a drive shaft and a rotary transducer that has a stator, a rotor that is rotatable relative to the stator and has a radially deformed part and a clamping device for connecting the rotor to the drive shaft in a manner fixed against relative rotation. The clamping device includes an eccentric cam that is rotatably supported in a bore of the rotor and has an eccentric circumferential face, wherein the eccentric circumferential face, upon rotation, comes into contact with the deformable part of the rotor and partially deforms it in the region of contact and forces it onto the drive shaft.

A third aspect of the present invention regards a rotary transducer and drive shaft system that includes a drive shaft and a rotary transducer that has a stator; a rotor that is rotatable relative to the stator and a clamping device for connecting the rotor to the drive shaft in a manner fixed against relative rotation. The clamping device includes a first eccentric cam with a spirally curved circumferential face and a second eccentric cam with a spirally curved circumferential face, wherein the first and second eccentric cams are each rotatably supported in a corresponding bore of the rotor, and the spiral circumferential faces of the first and second eccentric cams, upon rotation, come into contact with the drive shaft and clamp it. In addition, a radius (r) of the circumferential face of the first eccentric cam increases steadily counter-clockwise over virtually the entire circumference, and a radius (r) of the circumferential face of the second eccentric cam increases steadily clockwise over virtually the entire circumference.

The advantages attained with each of the above aspects of the present invention are in particular that the clamping device is easy to make, can be adapted easily to arbitrary diameters of the drive shaft to be clamped, is axially easily accessible and actuatable, and assures a reliable connection of the rotor of the rotary transducer to the drive shaft of the drive unit in a manner fixed against relative rotation.

Exemplary embodiments of the invention will be described in further detail below in conjunction with the drawings.

DETAILED DESCRIPTION OF THE INVENTION

Figure 1:
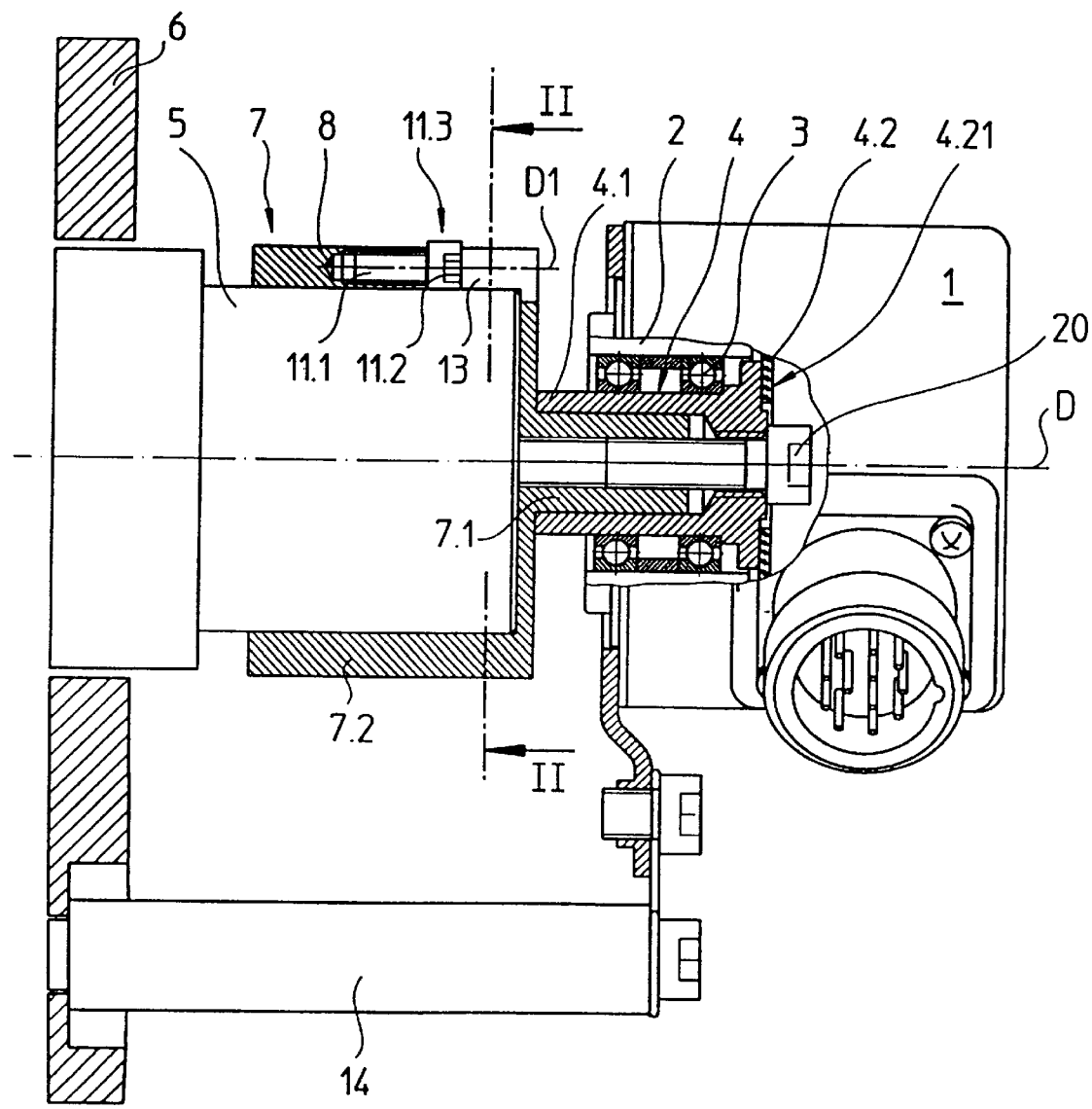
FIG. 1 shows a longitudinal section of a first embodiment of a rotary transducer with a clamping device according to the present invention.
Figure 2:
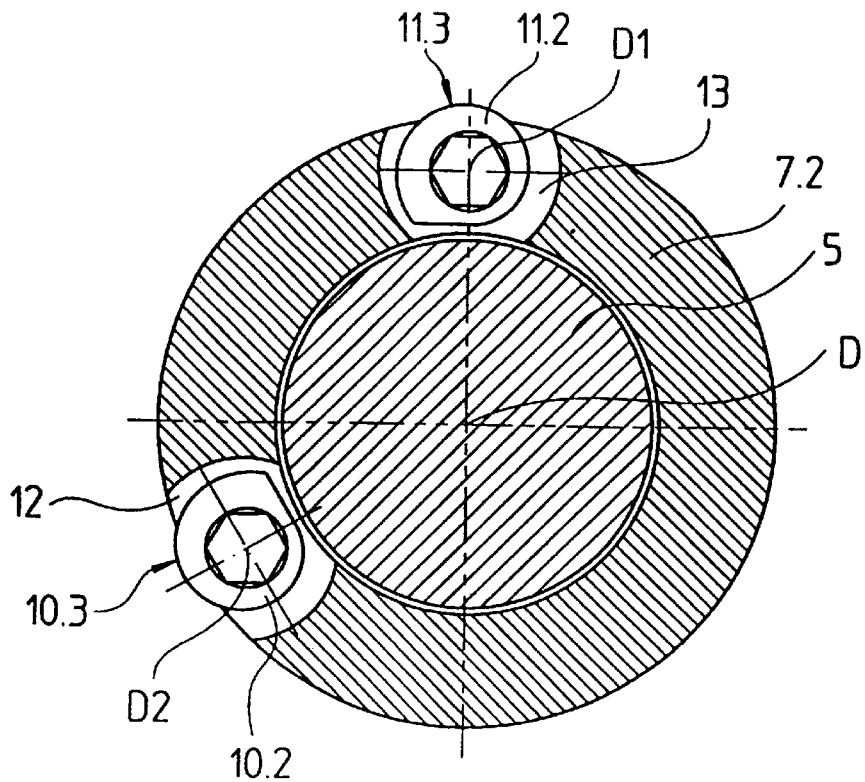
FIG. 2 shows the rotary transducer with a clamping device of FIG. 1 in an unclamped state and in a cross section taken along the line II—II of FIG. 1.
Figure 3:
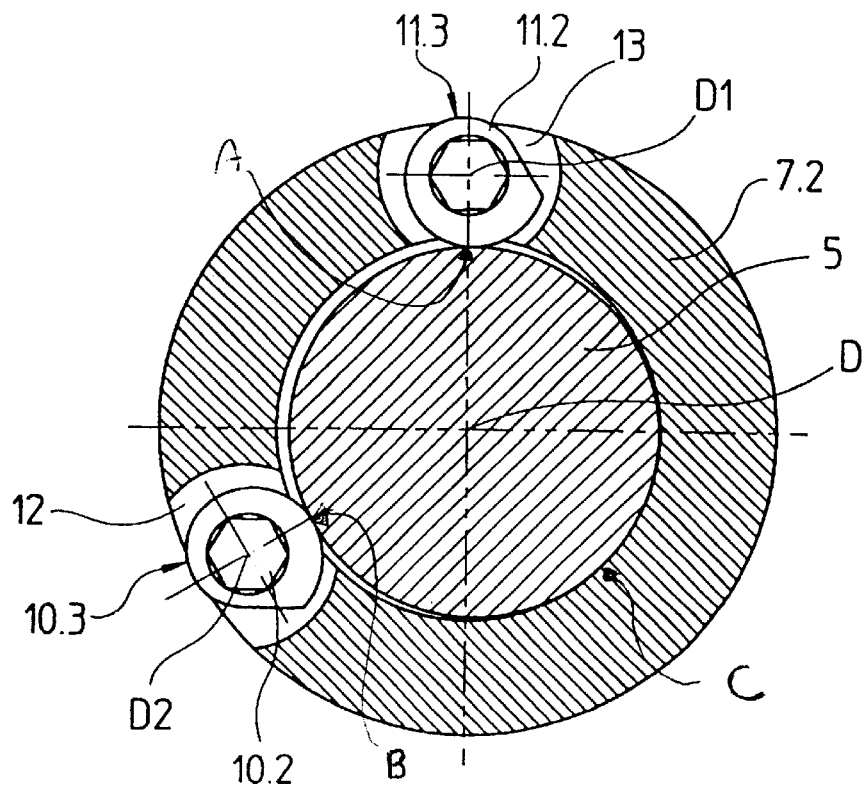
FIG. 3 shows the rotary transducer with a clamping device of FIG. 1 in a clamped state and in a cross section taken along the line II—II of FIG. 1.

A first exemplary embodiment of a rotary transducer 1 is shown in longitudinal section in FIG. 1, and in cross section in FIGS. 2 and 3. The rotary transducer 1 has a stator 2, in which a rotor 4 is rotatably supported about the pivot axis D by a ball bearing 3. The rotor 4 comprises a hollow transducer shaft 4.1 and a code disk 4.2 secured to it in a manner fixed against relative rotation and having an incremental or an absolute angle graduation 4.21. This angle graduation 4.21 is scanned in a known manner by a scanner unit, secured in the stator 2, in order to ascertain the relative angular position of the transducer shaft 4.1.

In the first exemplary embodiment, a drive shaft 5 of a drive unit 6 is meant to be coupled in a manner fixed against relative rotation to the transducer shaft 4.1. The outside diameter of the drive shaft 5 is multiple times greater than the outside or inside diameter, available for clamping, of the transducer shaft 4.1. Given this situation, an adapter 7 is coupled to the transducer shaft 4.1 and serves to couple the rotor 4 to the drive shaft 5. On the side toward the transducer, this adapter 7 has a corrugated region 7.1, with which it is clamped in the hollow shaft 4.1 by means of the screw 20. The corrugated region 7.2 of the adapter 7 on the drive side is embodied as a hollow shaft, with an inside diameter that is somewhat greater than the outside diameter of the drive shaft 5. In the corrugated region 7.2 of the adapter 7 on the drive side, two threaded bores 8 extending axially and parallel to the pivot axis D of the transducer shaft 4.1 are made, in each of which a respective eccentric cam 10 and 11 is supported rotatably about its pivot axis D1 and D2, respectively. Each of the eccentric cams 10, 11 is a pin or screw 10.1, 11.1 with a head 10.2, 11.2 that has an eccentric circumferential face 10.3 and 11.3, respectively. In the region of the head 10.2, 11.2, openings 12, 13 are made in the adapter 7 in the direction of the surface of the drive shaft 5. Upon rotation of the eccentric cams 10, 11 in the bores 8, the eccentric surfaces 10.3 and 11.3 move in the openings 12 and 13 in the direction of the drive shaft 5 until they touch the drive shaft and clamp it.

It is especially advantageous if at least two eccentric cams 10 and 11 clamp at circumferentially offset locations on the drive shaft 5. If these locations are offset by about 120° from one another, the drive shaft 5 is clamped at three places A, B and C, as can be seen in FIG. 3.

Figure 4:
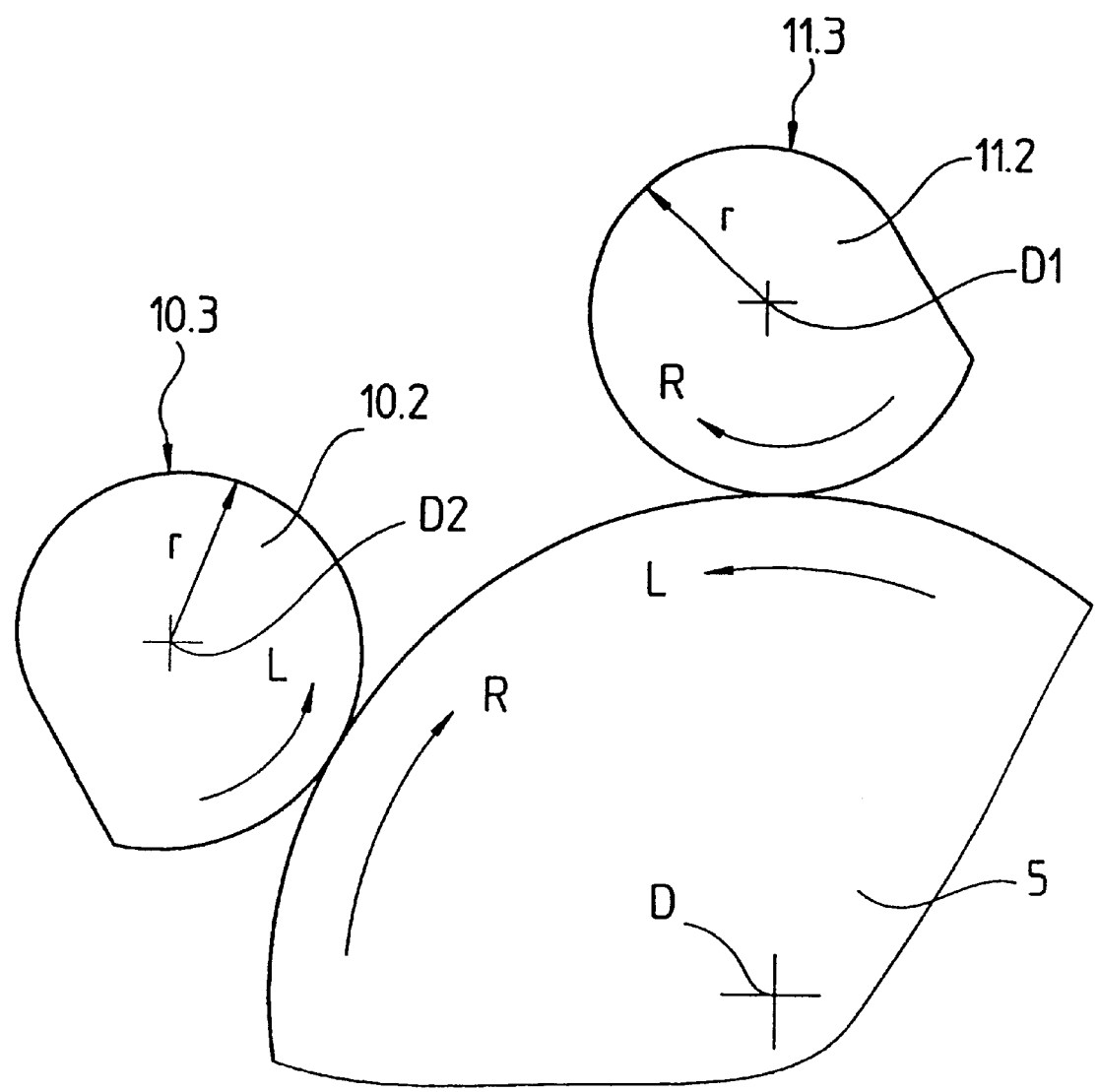
FIG. 4 illustrates the principle of the clamping of the rotary transducers of FIGS. 1–3, on a larger scale.

To attain the most torsionally rigid possible clamping in both possible directions of rotation L, R, one eccentric cam 10 is clamped to the drive shaft 5 by counterclockwise rotation L, while the other eccentric cam 11 is clamped to it by clockwise rotation R. Self-locking is thus attained in both directions of rotation L, R of the drive shaft 5. In FIG. 4, this principle of self-locking is schematically shown again on a larger scale. For clamping, the eccentric cam 10 is rotated toward the left L—that is, counterclockwise—about the pivot axis D2, while conversely the eccentric cam 11 is rotated about the pivot axis D1 toward the right R—that is, clockwise. If the drive shaft 5 rotates to the right R about the pivot axis D, then because of inertia a torque is exerted by the surface of the drive shaft 5 onto the circumferential face 10.3 of the eccentric cam 10, and this torque acts toward the left L, or in other words in the clamping direction, and reinforces the clamping action. If the drive shaft 5 rotates toward the left L about the pivot axis D, then a torque is exerted by the surface of the drive shaft 5 onto the circumferential face 11.3 of the eccentric cam 11, and this torque acts toward the right R, or in other words in the clamping direction of the eccentric cam 11, and reinforces the clamping action in this direction of rotation as well.

The eccentric surface or circumferential face 10.3 and 11.3 can be a circular circumferential face of the head 10.2 and 11.2, whose center point is radially offset from the pivot axis D1, D2 of the pin or screw 10.1, 11.1.

However, it is especially advantageous, as shown in FIGS. 2–4, to embody the circumferential face 10.3 and 11.3 in the form of a spiral, especially an Archimedes spiral. These spiral circumferential faces 10.3 and 11.3 are distinguished in that the radius r—in contrast to the circular circumferential face—increases steadily over far more than 180°. The wedge action on which the clamping is based is especially good because the attainable wedge angle is relatively small.

Each of the pins or screws 10.1, 11.1 is embodied such that it can be rotated about its pivot axis D1, D2 by a tool that can be made to approach it radially, but especially axially. To that end, they are advantageously oriented parallel to the pivot axis D.

For torsionally secure assembly of the stator 2 of the rotary transducer 1, the latter is secured to the drive unit 6 by means of the mounting 14 shown in FIG. 1.

Figure 5:
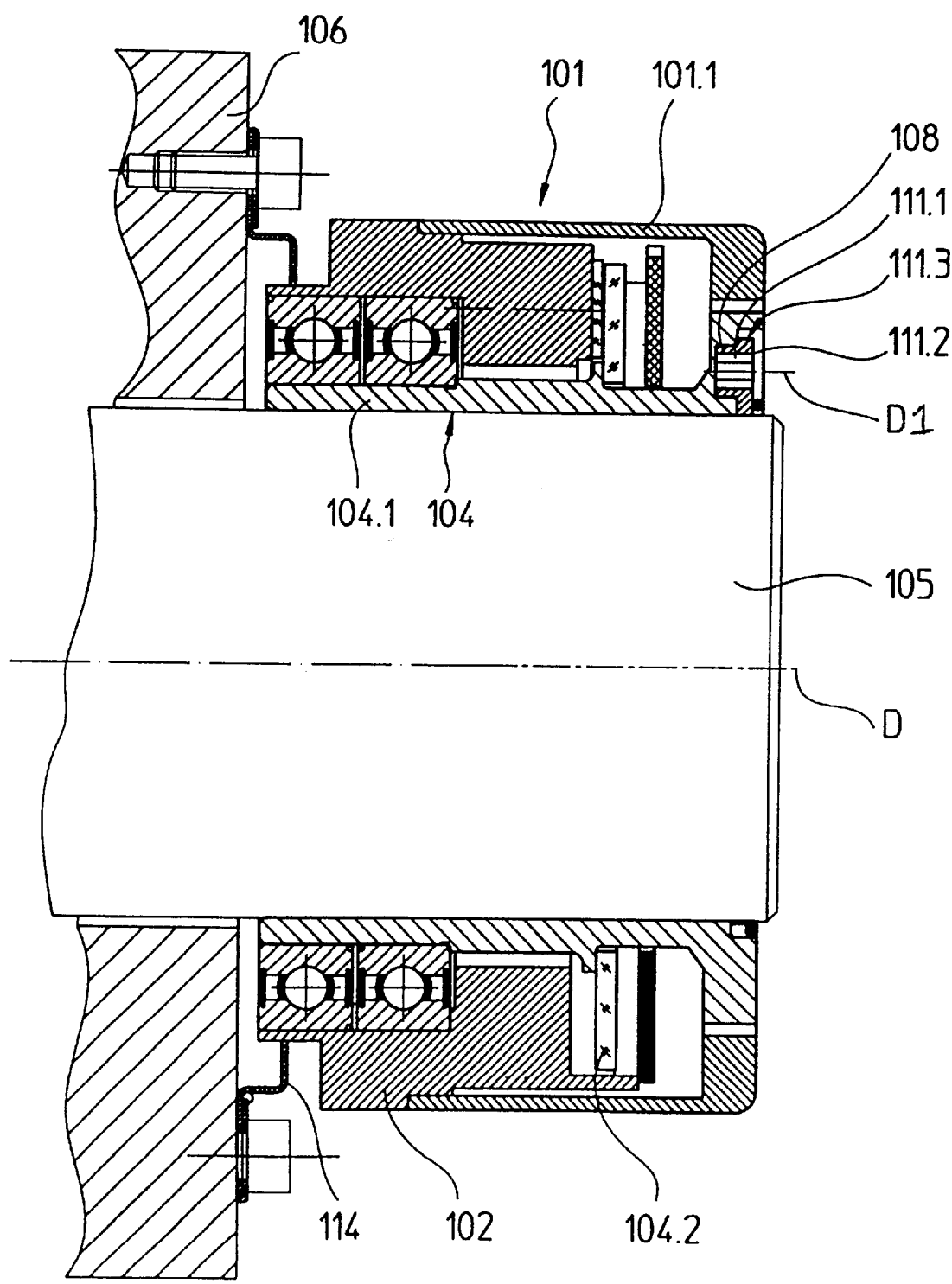
FIG. 5 shows a longitudinal section of a second embodiment of a rotary transducer with an integrated clamping device according to the present invention.

The adapter 7 is not required, if the diameters of the drive shaft 5 and the transducer shaft 4.1 are the same or at least nearly the same. One such rotary transducer is shown as the second exemplary embodiment in FIG. 5. For better association of the individual parts with one another, the reference numerals in the second and third exemplary embodiments are the same as in the first exemplary embodiment but raised by 100. The clamping device is then integrated with the rotary transducer 101 itself, in that the eccentric cams 111 are rotatably supported in bores 108 of the transducer shaft 104.1 and radially clamp to the drive shaft 105. In the second exemplary embodiment, again advantageously at least two eccentric cams 111 are disposed in offset fashion on the circumferential region of the transducer shaft 104.1. The circumferential face 111.3 extending eccentrically—and in particular spirally—to the pivot axis D1 shifts radially, upon rotation, toward the drive shaft 105 and clamps it, in that the circumferential face 111.3 comes directly into contact with the surface of the drive shaft 105. One eccentric cam again clamps with the radius r that increases in the clockwise direction, and the other clamps with the radius r that increases in the counterclockwise direction, as already shown in principle in FIG. 4. It is especially advantageous if the transducer shaft 104.1 is a hollow shaft, and if the eccentric cams 111 are integrated entirely inside the outer contour, that is, inside the housing 101.1 of the rotary transducer 101, and are axially accessible and actuatable from the free back side.

Figure 6:
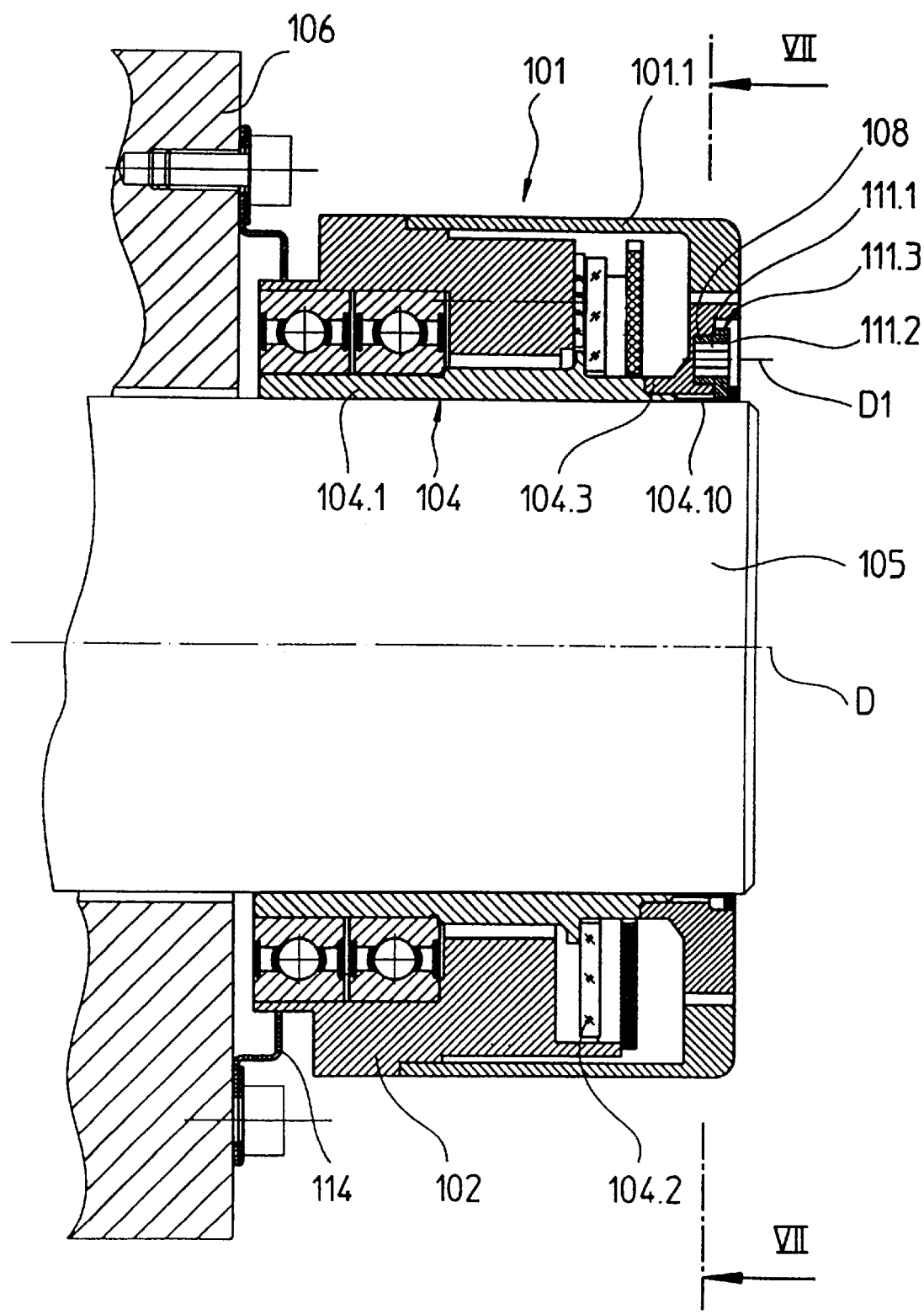
FIG. 6 shows a longitudinal section of a third embodiment of a rotary transducer with an integrated clamping device according to the present invention.
Figure 7:
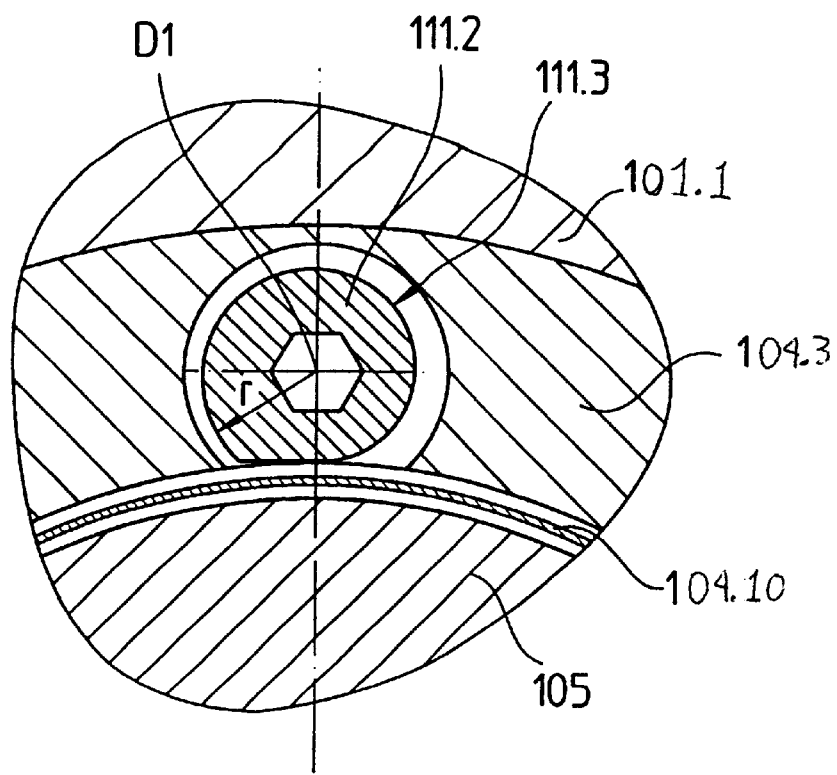
FIG. 7 shows the rotary transducer with an integrated clamping device of FIG. 6 in an unclamped state and in a cross section taken along the line VII—VII of FIG. 6.
Figure 8:
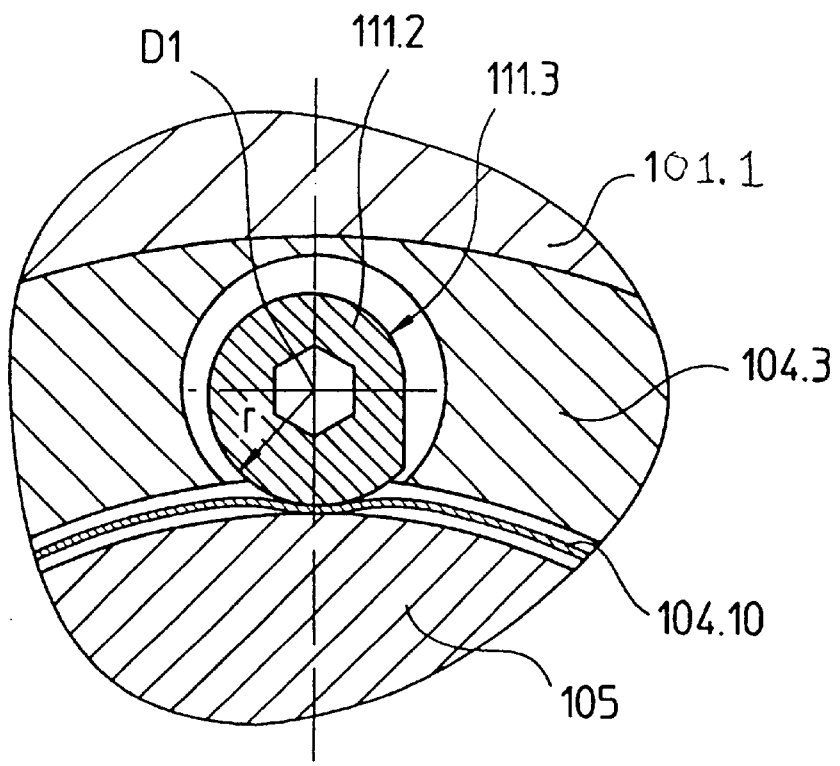
FIG. 8 shows the rotary transducer with an integrated clamping device of FIG. 6 in a clamped state and in a cross section taken along the line VII—VII of FIG. 6.

The third exemplary embodiment, shown in FIGS. 6–8, involves a rotary transducer 101 with a stator 102 and a rotor 104, as in the second exemplary embodiment. The rotor 104 has a transducer shaft 104.1 in the form of a hollow shaft that is supported in the stator 102 and carries a code disk 104.2. The stator 102 is secured in a manner fixed against relative rotation to a drive unit 106 via a mounting 1 14. For the sake of coupling of the rotor 104, that is, the transducer shaft 104.1, to a drive shaft 105 in a manner fixed against relative rotation, once again at least one eccentric cam 111 is rotatably supported about the pivot axis D1 in a portion of the rotor 104. The eccentric cam 111 again comprises a pin 111.1, which is supported in an axially extending bore 108 of the transducer shaft 104.1 and comprises a head 111.2, formed on the transducer shaft, with an eccentric circumferential face 111.3. Upon rotation, this circumferential face 111.3, extending eccentrically to the pivot axis D1, shifts radially toward the drive shaft 105 and clamps it, in that the circumferential face 111.3 enters into contact with an elastically deformable and radially deflectable wall 104.10 of the transducer shaft 104.1 and in the region of contact partially deforms it in the radial direction and presses against the drive shaft 105 in the region of the deformation. It is especially advantageous if the wall 104.10 is a turned region of the transducer shaft 104.1 made by machining on a lathe.

Instead of an encompassing collar in the form of a weakened wall 104.10 extending all the way around, a wall partially weakened only in the region of engagement by the eccentric cam 111 can also be provided in the transducer shaft 104.1. It is also possible for the weakened wall to be slotted in addition.

For stable clamping, the eccentric circumferential face 111.3 should again be spiral, in particular in the form of an Archimedes spiral, with the radius r increasing steadily over a circumferential region of far more than 180°.

In FIGS. 7 and 8, the clamping region is shown on a larger scale. FIG. 7 shows the unclamped state and FIG. 8 the clamped state.

To decrease the structural size, it is advantageous if the at least one eccentric cam 111 is accommodated entirely inside the outer contour of the rotary transducer 101, or in other words inside the housing 101.1, and is axially accessible and actuatable from the back side of the rotary transducer 101.

The eccentric cam 111 can be disposed directly in the transducer shaft 104.1, or on a ring 104.3 secured to the transducer shaft 104.1 in a manner fixed against relative rotation, or on a ring 104.3 rotatably supported on the transducer shaft 104.1. In this last case, in the unclamped state the ring 104.3 is supported loosely on the transducer shaft 104.1 or in other words rotatably about the pivot axis D, and the securing in a manner fixed against relative rotation that is required for operation is effected by the radial clamping via the wall 104.10. This version has the advantage that the rotational position of the eccentric cam relative to the circumference of the drive shaft 105 can be selected freely by rotating the ring 104.3 before the clamping is done.

The code disk 4.2, 104.2 of the embodiments of FIGS. 1–8 can have a photoelectrically, capacitively, magnetically or inductively scannable angle graduation. The angle graduation can be embodied in incremental and/or absolute form.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A rotary transducer and drive shaft system comprising:
    a drive shaft;
    a rotary transducer comprising:
        a stator;
        a rotor that is rotatable relative to said stator,
        a clamping device for connecting said rotor to said drive shaft in a manner fixed against relative rotation, wherein said clamping device comprises an eccentric cam that is rotatably supported in a bore of said rotor and has an eccentric circumferential face comes into contact with said drive shaft and clamps it upon rotation.

2. The system of claim 1, wherein said bore extends parallel to a pivot axis of said rotor.

3. The system of claim 1, wherein said rotor comprises:
    a transducer shaft that is supported in the stator;
    a code disk; and
    an opening for receiving said drive shaft, wherein said eccentric cam is rotatably supported about its pivot axis on a circumferential region of said opening.

4. The system of claim 1, wherein said rotor comprises a code disk and a transducer shaft supported in said stator; said system further comprises:
    a rotor element in the form of an adapter, said rotor element is coupled to said transducer shaft in a manner fixed against relative rotation, wherein said adapter has an opening for receiving said drive shaft and said eccentric cam is rotatably supported on a circumferential region of said opening of said adapter; and
    wherein an outside diameter of said drive shaft is substantially larger than the available diameter of said transducer shaft and said adapter has a region toward said transducer shaft with a diameter corresponding at least approximately to the transducer shaft and a second region having a substantially greater diameter for clamping to said drive shaft.

5. The system of claim 3, wherein a recess is provided in the direction of said circumferential region of said opening of said transducer shaft or of the adapter through which said eccentric circumferential face of said eccentric cam can be shifted radially toward said transducer shaft.

6. The system of claim 4, wherein a recess is provided in the direction of said circumferential region of said opening of said transducer shaft or of the adapter through which said eccentric circumferential face of said eccentric cam can be shifted radially toward said transducer shaft.

7. The system of claim 1, further comprising a second eccentric cam disposed on the circumference of said rotor, wherein said eccentric cam enters into contact with said drive shaft by a clockwise rotation and said second eccentric cam enters into contact with said drive shaft by a counter-clockwise rotation.

8. The system of claim 1, wherein said eccentric circumferential face is shaped spirally and has a radius (r) that increases over a range of far more than 180°.

9. The system of claim 7, wherein a radius (r) of said circumferential face of said second eccentric cam increases steadily over virtually the entire circumference counterclockwise, and a radius (r) of the circumferential face of said eccentric cam increases steadily over virtually the entire circumference clockwise.

10. A rotary transducer and drive haft system comprising:
    a drive shaft;
    a rotary transducer comprising:
        a stator;
        a rotor that is rotatable relative to said stator and comprises a radially deformed part;
        a clamping device for connecting said rotor to said drive shaft in a manner fixed against relative rotation, wherein said clamping device comprises an eccentric cam that is rotatably supported in a bore of said rotor and has an eccentric circumferential face, wherein said eccentric circumferential face, upon rotation, comes into contact with said deformable part of said rotor and partially deforms it in the region of contact and forces it onto said drive shaft.

11. The system of claim 10, wherein said bore extends parallel to a pivot axis of said rotor.

12. The system of claim 10, wherein said rotor comprises:
    a transducer shaft that is supported in said stator;
    a code disk; and
    an opening for receiving said drive shaft, wherein said eccentric cam is rotatably supported about its pivot axis on a circumferential region of said opening.

13. The system claim 10, wherein said eccentric circumferential face is shaped spirally and has a radius (r) that increases over a range of far more than 180°.

14. The system of claim 10, wherein said deformable part is an encompassing collar of a transducer shaft supported in said stator and carries a code disk, and said collar is embodied in one piece with said transducer shaft.

15. The system of claim 10, wherein said eccentric cam is integrated entirely inside said rotary transducer.

16. A rotary transducer and drive shaft system comprising:
    a drive shaft;
    a rotary transducer comprising:
        a stator;
        a rotor that is rotatable relative to said stator;
        a clamping device for connecting said rotor to said drive shaft in a manner fixed against relative rotation, wherein said clamping device comprises a first eccentric cam with a spirally curved circumferential face and a second eccentric cam with a spirally curved circumferential face, said first and second eccentric cams are each rotatably supported in a corresponding bore of said rotor, and said spiral circumferential faces of said first and second eccentric cams, upon rotation, come into contact with said drive shaft and clamp it, and wherein a radius (r) of said circumferential face of said first eccentric cam increases steadily counter-clockwise over virtually the entire circumference, and a radius (r) of said circumferential face of said second eccentric cam increases steadily clockwise over virtually the entire circumference.

* * * * *

UNITED STATES PATENT AND TRADEMARK OFFICE
CERTIFICATE OF CORRECTION

PATENT NO. : 6,311,402 B1
DATED : November 6, 2001
INVENTOR(S) : Alois Brandl et al.

It is certified that error appears in the above-identified patent and that said Letters Patent is hereby corrected as shown below:

Column 6,
Line 50, after "system" insert -- of --.

Signed and Sealed this

Thirty-first Day of December, 2002

JAMES E. ROGAN
*Director of the United States Patent and Trademark Office*